US 11,853,187 B1

United States Patent
Roche et al.

(10) Patent No.: US 11,853,187 B1
(45) Date of Patent: Dec. 26, 2023

(54) SYSTEM AND METHOD FOR REMOTE MANAGEMENT OF DATA PROCESSING SYSTEMS

(71) Applicant: Dell Products L.P., Round Rock, TX (US)

(72) Inventors: Ian Roche, Glanmire (IE); Philip E. Hummel, San Jose, CA (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/157,254

(22) Filed: Jan. 20, 2023

(51) Int. Cl.
  *G06F 11/30* (2006.01)
  *G06F 11/34* (2006.01)

(52) U.S. Cl.
  CPC ...... *G06F 11/3055* (2013.01); *G06F 11/3072* (2013.01); *G06F 11/3466* (2013.01); *G06F 11/3476* (2013.01)

(58) Field of Classification Search
  CPC ............ G06F 11/3055; G06F 11/3072; G06F 11/3447; G06F 11/3452; G06F 11/3466; G06F 11/3476
  See application file for complete search history.

(56) References Cited

U.S. PATENT DOCUMENTS 11,010,233 B1 * 5/2021 Golden ................. G06N 3/047
11,561,849 B1 * 1/2023 Kairali .................. G06F 9/542
2022/0058174 A1 * 2/2022 Lemberg ............. G06F 11/3075
2022/0291989 A1 * 9/2022 Wang ...................... H04L 41/16
2022/0398239 A1 * 12/2022 Mehta ................. G06F 11/0793

OTHER PUBLICATIONS

Li, Meiman et al., "Pedestrian Motion Path Detection Method Based on Deep Learning and Foreground Detection." Complexity 2021 (11 Pages).
Hasan, Irtiza et al., "Pedestrian Detection: Domain Generalization, CNNs, Transformers and Beyond." arXiv preprint arXiv:2201. 03176 (2022) (13 Pages).
Hellinga, Bruce et al., "Route selection considering travel time variability." 6th World Congress on Intelligent Transport Systems, Toronto, Ontario. 1999 (8 Pages).
Hutchinson, Chris, "Building a Real-world Public Transport Routing Algorithm", Aug. 8, 2021, <https://traveltime.com/blog/public-transport-routing-algorithm> (13 Pages).
Huang, Wenbo et al., "Dynamic Guidance Strategy for Pedestrian Travel in Large-Scale Activity under Harsh Environment." Journal of Advanced Transportation 2022 (16 Pages).
Makris, Dimitrios et al., "Path detection in video surveillance." image and Vision Computing 20.12 (2002): 895-903 (18 Pages).

* cited by examiner

*Primary Examiner* — Yolanda L Wilson
(74) *Attorney, Agent, or Firm* — Womble Bond Dickinson (US) LLP

(57) ABSTRACT

Methods and systems for managing operation of data processing systems are disclosed. To manage operation of the data processing systems, telemetry data for the data processing systems may be collected and used to estimate the health of the data processing systems. The rates and types of telemetry data this is collected may be dynamically adjusted based on the confidence in estimates for the health of the data processing systems. The collection rate and/or number of monitored quantities may be increased as the confidence in the estimated health of the data processing systems decreases.

20 Claims, 4 Drawing Sheets

SYSTEM AND METHOD FOR REMOTE MANAGEMENT OF DATA PROCESSING SYSTEMS

FIELD

Embodiments disclosed herein relate generally to device management. More particularly, embodiments disclosed herein relate to systems and methods to manage the operation of data processing systems in a distributed system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
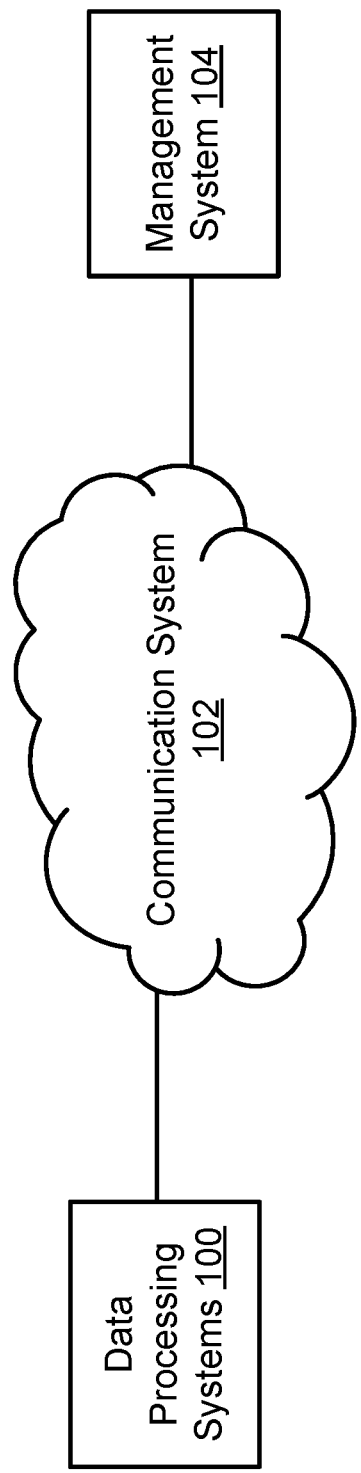
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, telemetry data may be collected and used to infer the health of the data processing systems. The health of the data processing systems may be used to identify and perform actions that may reduce the likelihood of the data processing systems becoming impaired.

Collection of telemetry data may be a computationally expensive task. To manage the computation cost for collection of telemetry data, the rates at which and quantities that are monitored to obtain telemetry data may be dynamically updated over time. The dynamic updates may be based on level of confidence in inferred health states of the data processing systems obtained using collected telemetry data.

As the confidence levels in the inferred health states is reduced, the monitoring rates and number of monitored quantities may be increased. Conversely, as the confidence levels in the inferred health states is increased, the monitoring rates and number of monitored quantities may be decreased. If the confidence levels for the inferred health states fall below a threshold, then additional telemetry data may be collected and used to revise the inferred health states.

Once an inferred health state of sufficiently high confidence is achieved, actions may be identified and used to update the operation of the data processing systems. The actions may be identified, for example, based on the telemetry data upon which the health state is based, the health state, and/or the confidence level in the health state. For example, a set of rules keyed to these quantities may be used to identify actions usable update the operation of data processing systems.

By doing so, embodiments disclosed herein may provide a system for managing the operation of data processing systems that improved the likelihood of the data processing systems continuing to provide desired computer implemented services, while also managing computational overhead for the management. For example, by dynamically adjusting telemetry data collection, the disclosed system may provide desired levels of accuracy in inferences while also marshalling use of limited available computing resources to obtain the inferences.

Thus, embodiments disclosed herein may address, among other problems, the technical problem of limited availability of computing resources in distributed systems. Embodiments disclosed herein may address this technical problem by reducing resource consumption for telemetry data collection when higher rates/levels of telemetry data collection are unlikely to provide advantages in terms of managing the operation of data processing systems.

In an embodiment, a method for managing operation of data processing systems is provided. The method may include obtaining, using first telemetry data for a data processing system of the data processing systems, a first inference indicating: a health status for the data processing system, and a confidence level for the first inference; in a first instance of the first inference where the confidence level for the first inference falls below a threshold: obtaining, based on content of the first telemetry data, a revised collection plan for the data processing system; obtaining, using the revised collection plan, second telemetry data for the data processing system; obtaining, using the second telemetry data, a second inference indicating: a revised health status for the data processing system, and a confidence level for the second inference; obtaining, using the revised health status, an action plan; and updating operation of the data processing based on the action plan to reduce a likelihood of the data processing system becoming impaired.

The method may also include, in a second instance of the first inference where the confidence level for the first inference meets the threshold: obtaining, using the health status, a second action plan; and updating operation of the data processing based on the second action plan to reduce the likelihood of the data processing system becoming impaired.

Obtaining the revised collection plan may include identifying a suspect quantity based on the content of the first telemetry data; identifying a collection rate for the suspect quantity in a collection plan used to obtain the first telemetry data; and establishing, in the revised collection plan, a revised collection rate for the suspect quantity that exceeds the collection rate for the suspect quantity.

Obtaining the revised collection plan may also include identifying a second suspect quantity based on the suspect quantity, the collection plan indicating that the second suspect quantity is not monitored; and establishing, in the revised collection plan, a collection rate for the second suspect quantity.

Identifying the suspect quantity may include performing anomaly detection for the first telemetry data using a telemetry data repository, the anomaly detection indicating that the suspect quantity is anomalous.

Identifying the suspect quantity may include performing rules based analysis for the first telemetry data, the rules based analysis indicating that the suspect quantity is not correlated with another quantity from the first telemetry data that is correlated with the suspect quantity.

Obtaining the second telemetry data may include configuring the data processing system to perform telemetry collection based on the revised collection plan; and obtaining the second telemetry data from the configured data processing system.

The method may also include performing, using the second telemetry data, reinforced learning to update operation of an inference model used to obtain the action set. During reinforced learning, new telemetry data and corresponding labels may be used to update the operation of the inference model over time based on how well previously performed actions corrected undesired operation of data processing systems.

Obtaining the action set may include ingesting, by the inference model, the second telemetry data to identify an action of the action set; and adding the action to the action set.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer-implemented services, the system may include any number of data processing systems 100. Data processing systems 100 may provide the computer implemented services to users of data processing systems 100 and/or to other devices (not shown), and/or may cooperate with other devices that provide the computer implemented services. Different data processing systems may provide similar and/or different computer implemented services.

For example, any of data processing systems 100 may be members of cloud environments that provide the computer implemented services. The cloud environments may include any number of devices that provide computer implemented services.

To provide the computer-implemented services, data processing systems 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide certain computer-implemented services, the hardware and/or software components may need to operate in predetermined manners. If the hardware and/or software components do not operate in the predetermined manners, then a data processing systems may be unable to provide all, or a portion, of the computer-implemented services that it normally provides.

In general, embodiments disclosed herein may provide methods, systems, and/or devices for managing the operation of data processing systems 100. To manage the operation of data processing system 100, management system 104 may collect telemetry data. The telemetry data may reflect the operation of data processing systems 100.

The telemetry data may be used to identify health states of data processing systems 100, or portions thereof (e.g., individual hardware components). The health states of the data processing systems may be used to select various actions. The actions, when performed, may reduce a likelihood of a data processing system failing in the future.

To identify the health states of data processing system, management system 104 may use an inference model (e.g., trained machine learning model, expert systems, etc.) to identify the health of the data processing systems based on the collected telemetry data. Due to limitations of the inference models (e.g., the quantity of data on which the inference models may be trained, the knowledge of experts that created rules governing decision making, etc.), the inference models may not always make accurate predictions (e.g., inferences) regarding the health of the data processing systems.

To reduce an impact of inaccurate inferences, confidence levels for the inferences may also be obtained. The confidence levels may be used to modify collection of telemetry data. For example, when an inference is generated for which the inference model has a low level of confidence in the inference, the telemetry data collection process for telemetry data upon which the inference is based may be modified. The modified collection process may, for example, increase the rate of collection of telemetry data, expand the types of collected telemetry data, and/or otherwise modify the telemetry data collection process.

Once modified, additional telemetry data may be collected and used to refine inferences regarding the health states of data processing systems. The resulting inference may be more likely to accurate reflect the actual health states of the data processing systems.

Figure 2:
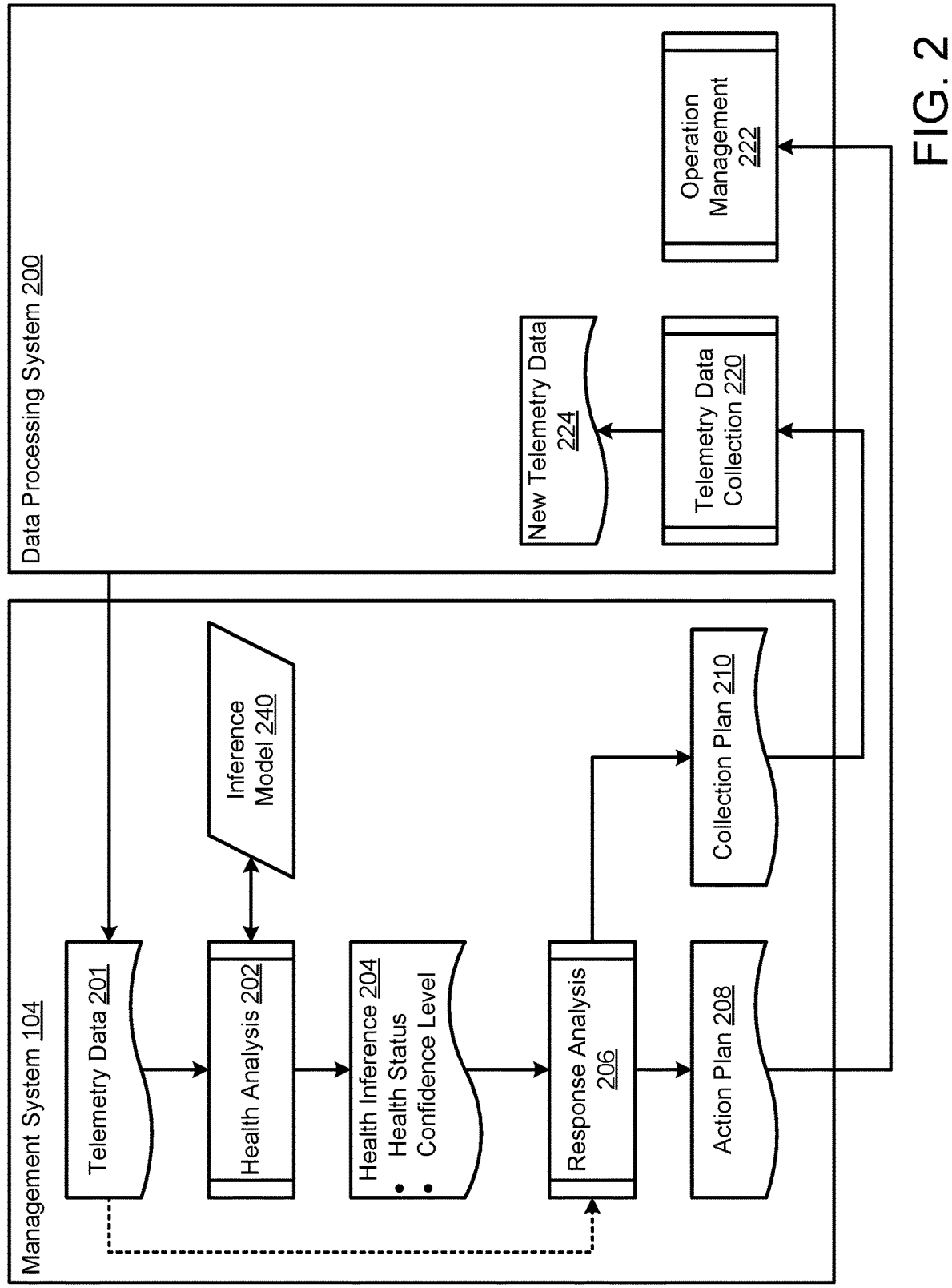
FIG. 2 show a diagram illustrating data flows in accordance with an embodiment.

Similar processes may be performed when inferences indicating high levels of confidence are obtained. Except, rather than increasing the rate and types of telemetry data collected, the rate and/or types of telemetry data collected may be reduced. Refer to FIG. 2 for additional details regarding managing types and rates of collected telemetry data.

By doing so, embodiments disclosed herein may reduce consumption of computing resources for data processing system management without substantially impacting the accuracy of health state estimations for data processing systems.

Figure 3:
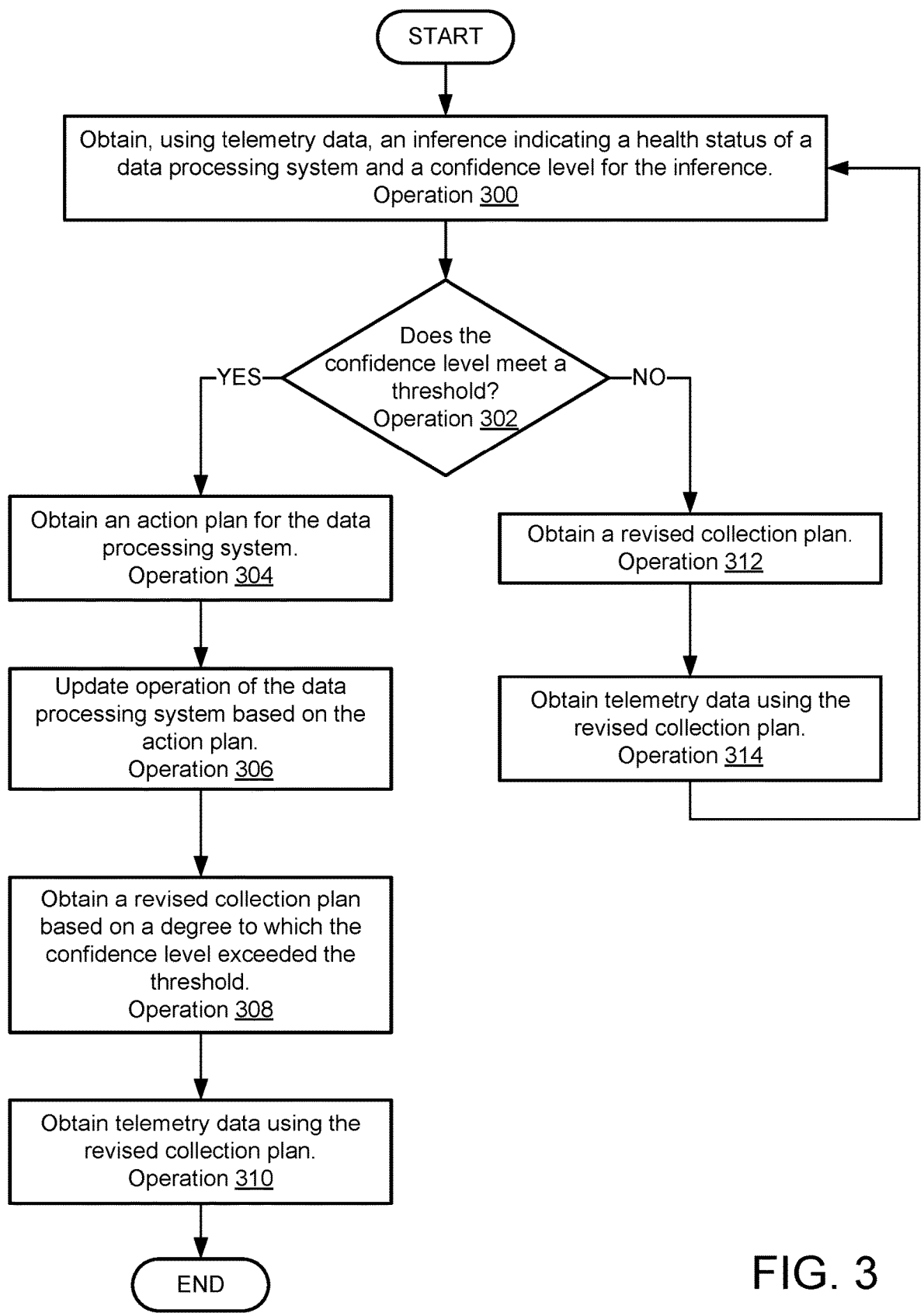
FIG. 3 show flow a diagram illustrating a method of managing operation of data processing systems in accordance with an embodiment.

When providing their functionality, any of data processing system 100 and management system 104 may perform all, or a portion, of the method illustrated in FIG. 3.

Any of data processing systems 100 and/or management system 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Management system 104 may be implemented with multiple computing devices. The computing devices of management system 104 may cooperatively perform processes for managing the operation of data processing systems. The computing devices of management system 104 may perform similar and/or different functions.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, a diagram illustrating data flows implemented by and data structures used by a system over time in accordance with an embodiment is shown in FIG. 2. In FIG. 2, data structures are represented using a first set of shapes (e.g., 200), models are represented using a second set of shapes (e.g., 240), and processes are represented using a third set of shapes (e.g., 202).

Turning to FIG. 2, a first data flow diagram illustrating data flows, data processing, and/or other operations that may be performed by the system of FIG. 1 in accordance with an embodiment is shown.

To manage the operation of data processing system 200, management system 104 may obtain telemetry data 201. Telemetry data 201 may be data structure that includes any type and quantity of information regarding the operation of data processing system 200. Telemetry data 201 may be collected by data processing system 200 based on a collection plan. The collection plan may indicate which quantities to monitor. For example, temperature of hardware components, power consumption rates, and/or other types of quantities may be monitored over time to obtain telemetry data 201.

When obtain, management system 104 may perform health analysis 202 using telemetry data 201. During health analysis 202, inference model 240 may ingest portions of telemetry data 201 and generate an output (i.e., health inference 204). Inference model 240 may be implemented using any type of predictive model (e.g., machine learning model, expert system, etc.). The predictive model may be updated overtime using, for example, reinforced learning or other techniques to update the operation of health inference 204 as additional training data becomes available.

Health inference 204 may indicate (i) a health status (e.g., health state) of data processing system 200, and (ii) a confidence level for the health status. The health status may be, for example, a ranking on a scale regarding the health of data processing system 200, or portions thereof such as hardware components. The confidence level for the health status may be, for example, a ranking on a scale regarding the confidence in the health status of health inference 204. The confidence level may be based on, for example, (i) a level of similarity between telemetry data 201 and training data upon which inference model 240 is based, (ii) structural analysis of inference model 240, and/or other analysis processes.

Health inference 204 may be used during response analysis 206 to identify actions to be performed to attempt to proactively modify the operation of data processing system 200 to reduce the likelihood of data processing system 200 becoming impaired or otherwise operating in an undesirable manner. For example, during response analysis 206 the health status (and/or telemetry data 201) may be used to identify one or more actions. The identified actions may be used to establish action plan 208. Action plan 208 may include any number of actions which may be performed by data processing system 200.

However, if the confidence level for the health status falls below a threshold, then management system 104 may attempt to obtain a health inference having a higher confidence level prior to identifying actions for action plan 208.

To do so, health inference 204 may also be used during response analysis 206 to identify a new collection plan (e.g., 210) for data processing system. Collection plan 210 may be generated if the confidence level for health inference 204 falls below a threshold.

When generated while the confidence level is below the threshold, collection plan 210 may increase rates of telemetry data collection and/or cause additional quantities regarding the operation of data processing system 200 to be monitored during telemetry data collection. The resulting collection plan 210 may be used to drive (e.g., collect telemetry data in accordance the collection plan) telemetry data collection 220 to cause new telemetry data 224 to be collected by data processing system 200. The resulting new telemetry data collected based on the collection plan may include finer grain information regarding various quantities, and/or additional quantities.

If the confidence level for the health status exceeds the threshold, then response analysis 206 may generate a collection plan with reduced rates of collection, and/or reduced numbers of quantities monitored during collection. The reduction in rates and/or numbers of monitored quantities may be proportional to or otherwise based on the degree to which the threshold is exceeded. In otherwise, as the confidence in health status of data processing system 200 increases, the monitoring rates and/or numbers of monitored quantities for telemetry data generation purposes may be reduced.

Once action plan 208 is generated (e.g., after a health inference having a confidence level that exceeds/meets the threshold is obtained), action plan 208 may be used to drive operation management 222 of data processing system 200.

During operation management 222, data processing system 200 may perform the actions specified by action plan 208.

In an embodiment, any of management system 104 and/or data processing system 200 are implemented using a hardware device including circuitry. The hardware device may be, for example, a digital signal processor, a field programmable gate array, or an application specific integrated circuit. The circuitry may be adapted to cause the hardware device to perform the functionality of management system 104 as discussed herein. Management system 104 may be implemented using other types of hardware devices without departing embodiment disclosed herein.

In an embodiment, any of management system 104 and/or data processing system 200 are implemented using a processor adapted to execute computing code stored on a persistent storage that when executed by the processor performs the functionality of management system 104 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, any of management system 104 and/or data processing system 200 include storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed herein. Any of these data structures may be implemented using, for example, lists, tables databases, linked lists, unstructured data, and/or other types of data structures.

As discussed above, the components of FIG. 1 may perform various methods to manage operation of data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing the operation of data processing systems in accordance with an embodiment is shown. The method may be performed by any of data processing systems 100, management system 104, or other components of the system shown in FIG. 1.

At operation 300, an inference indicating a health status of a data processing system and a confidence level for the inference are obtained. The inference and confidence level may be obtained by ingesting telemetry data for the data processing system into an inference model. The inference model may be implemented using, for example, a trained machine learning model. The trained machine learning model may be trained using historic telemetry data and health states of data processing systems. The inference model may be implemented using other types of trainable models.

The telemetry data may be obtained using a first collection plan.

At operation 302, a determination is made regarding whether the confidence level exceeds a threshold. The threshold may be based on a level of risk that an operator of the data processing system is willing to take on during management of the operation of the data processing system. If the confidence level exceeds the threshold, then the method may proceed to operation 304. Otherwise, the method may proceed to operation 312.

At operation 304, an action plan for the data processing system is obtained. The action plan may be obtained using another inference model. The inference model may ingest, for example, the telemetry data, the health status, and/or the confidence level and output one or more actions. The action plan may be based on the one or more actions.

The inference model may, for example, be a rule based model that associates actions with different patterns present in the telemetry data and/or under different health statuses of the data processing system. The other inference model may be implemented using other types of models.

At operation 306, operation of the data processing system is updated based on the action plan. The operation of the data processing system may be updated by (i) providing the action plan to the data processing system, and (ii) the data processing system performing the actions.

At operation 308, a revised collection plan is obtained. The revised collection plan, in comparison to the collection plan on which the telemetry data is based, may specify a reduced collection rate and/or a reduced number of quantities to be included in telemetry data collected based on the revised collection rate. The level of reduction may be based on the degree to which the confidence level exceeds the threshold. For example, the collection rate and number of collected quantities in the telemetry data may be reduced as the confidence level approaches a maximum level.

At operation 310, telemetry data is obtained using the revised collection plan. The telemetry data may be obtained by (i) providing the revised collection plan to the data processing system, and (ii) the data processing system collecting the telemetry data at rates and for the quantities indicated by the collection plan.

The method may end following operation 310. Thus, if the method is repeated, new telemetry data may be available to obtain a new inference in operation 300.

Returning to operation 302, the method may proceed to operation 312 following operation 302 if the confidence level does not meet the threshold.

At operation 312, a revised collection plan is obtained. The revised collection plan, in comparison to the collection plan on which the telemetry data is based, may specify an increased collection rate and/or an increased number of quantities to be included in telemetry data collected based on the revised collection rate. The level of increase may be based on the degree to which the confidence level fell below the threshold. For example, the collection rate may be increased as the confidence level falls progressively farther below the threshold.

The increased number of quantities may be established by identifying new quantities to be monitored for telemetry data collection purposes. The new quantities may be identified by performing anomaly detection or using a set of rules.

During anomaly detection, the telemetry data may be analyzed to identify any quantities that are anomalous. Relationships between the anomalous quantities and other quantities not monitored by the collection plan (e.g., of operation 300) may be identified. The other quantities may be used as the new quantities, and the revised collection plan may be obtained by supplementing the collection plan with additional instructions to monitor the new quantities. The relationships between the monitored quantities and the unmonitored quantities may be identified, for example, using subject matter experts, based on known relationships, through analyses processes, and/or via other methods.

During use of sets of rules, the telemetry data may be analyzed to identify any quantities that are not following known correlations to other quantities in the telemetry data. These identified quantities may be treated as being suspect. Relationships between the suspect quantities and other quantities not monitored by the collection plan (e.g., of operation 300) may be identified. The other quantities may be used as the new quantities, and the revised collection plan may be obtained by supplementing the collection plan with additional instructions to monitor the new quantities. The relationships between the monitored quantities and the unmonitored quantities may be identified, for example, using subject matter experts, based on known relationships, through analyses processes, and/or via other methods.

While described with respect to anomaly detection and sets of rules, the new quantities may be identified using other methods without departing from embodiments disclosed herein.

In addition to being used as a basis for identifying new quantities for monitoring, anomalous and suspect quantities may be used as a basis for selectively increasing the rate of telemetry collection. For example, rather than increasing the rate of collection of all quantities, the revised collection plan may specify increased rates (compared to the rates specified by the collection plan of operation 300) of collection of the suspect and/or anomalous quantities.

At operation 314, telemetry data is obtained using the revised collection plan. The telemetry data may be obtained similarly to as described with respect to operation 310.

The method may return to operation 300 following operation 314, and eventually end following operation 310 once an inference having a sufficiently high confidence level that meets the threshold is obtained.

Figure 4:
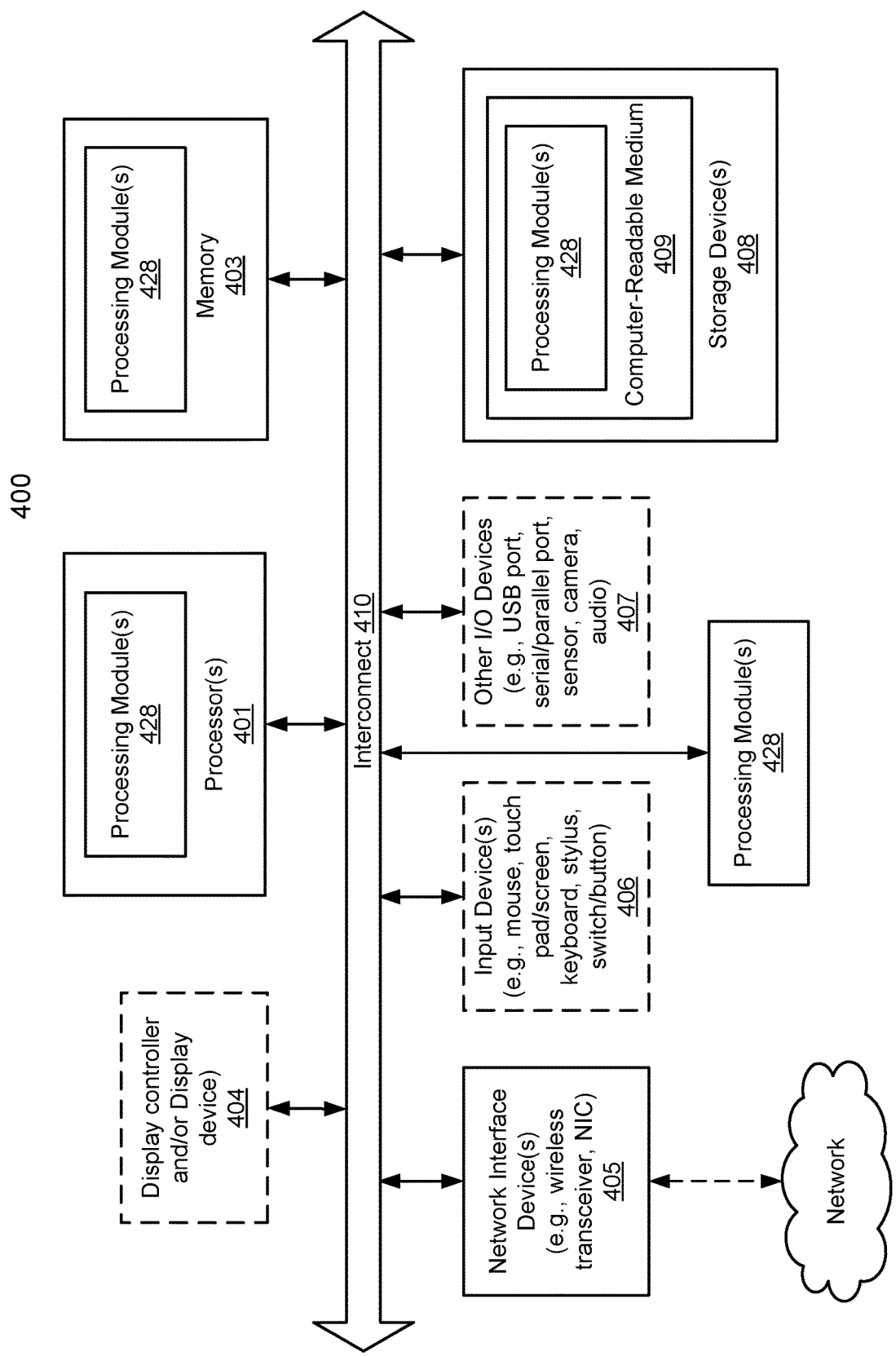
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of data processing systems, the method comprising:
   obtaining, using first telemetry data for a data processing system of the data processing
      systems, a first inference indicating:
      a health status for the data processing system, and
      a confidence level for the first inference;
   in a first instance of the first inference where the confidence level for the first inference falls below a threshold:
      obtaining, based on content of the first telemetry data, a revised collection plan for the data processing system;
      obtaining, using the revised collection plan, second telemetry data for the data processing system;
      obtaining, using the second telemetry data, a second inference indicating:
         a revised health status for the data processing system, and
         a confidence level for the second inference;
      obtaining, using the revised health status, an action plan; and
      updating operation of the data processing based on the action plan to reduce a likelihood of the data processing system becoming impaired.

2. The method of claim 1, further comprising:
   in a second instance of the first inference where the confidence level for the first inference meets the threshold:
      obtaining, using the health status, a second action plan; and
      updating operation of the data processing based on the second action plan to reduce the likelihood of the data processing system becoming impaired.

3. The method of claim 2, wherein obtaining the revised collection plan comprises:
   identifying a suspect quantity based on the content of the first telemetry data;
   identifying a collection rate for the suspect quantity in a collection plan used to obtain the first telemetry data; and
   establishing, in the revised collection plan, a revised collection rate for the suspect quantity that exceeds the collection rate for the suspect quantity.

4. The method of claim 3, wherein obtaining the revised collection plan further comprises:
   identifying a second suspect quantity based on the suspect quantity, the collection plan indicating that the second suspect quantity is not monitored; and
   establishing, in the revised collection plan, a collection rate for the second suspect quantity.

5. The method of claim 4, wherein identifying the suspect quantity comprises:
   performing anomaly detection for the first telemetry data using a telemetry data repository, the anomaly detection indicating that the suspect quantity is anomalous.

6. The method of claim 4, wherein identifying the suspect quantity comprises:
   performing rules based analysis for the first telemetry data, the rules based analysis indicating that the suspect quantity is not correlated with another quantity from the first telemetry data that is correlated with the suspect quantity.

7. The method of claim 1, wherein obtaining the second telemetry data comprises:
   configuring the data processing system to perform telemetry collection based on the revised collection plan; and
   obtaining the second telemetry data from the configured data processing system.

8. The method of claim 1, further comprising:
   performing, using the second telemetry data, reinforced learning to update operation of an inference model used to obtain the action set.

9. The method of claim 8, wherein obtaining the action set comprises:
   ingesting, by the inference model, the second telemetry data to identify an action of the action set; and
   adding the action to the action set.

10. A non-transitory machine-readable medium having instructions stored therein, which when executed by a processor, cause the processor to perform operations for managing operation of data processing systems, the operations comprising:
   obtaining, using first telemetry data for a data processing system of the data processing systems, a first inference indicating:
      a health status for the data processing system, and a confidence level for the first inference;
in a first instance of the first inference where the confidence level for the first inference falls below a threshold:
obtaining, based on content of the first telemetry data, a revised collection plan for the data processing system;
obtaining, using the revised collection plan, second telemetry data for the data processing system;
obtaining, using the second telemetry data, a second inference indicating:
a revised health status for the data processing system, and
a confidence level for the second inference;
obtaining, using the revised health status, an action plan; and
updating operation of the data processing based on the action plan to reduce a likelihood of the data processing system becoming impaired.

11. The non-transitory machine-readable medium of claim 10, wherein the operations further comprise:
in a second instance of the first inference where the confidence level for the first inference meets the threshold:
obtaining, using the health status, a second action plan; and
updating operation of the data processing based on the second action plan to reduce the likelihood of the data processing system becoming impaired.

12. The non-transitory machine-readable medium of claim 11, wherein obtaining the revised collection plan comprises:
identifying a suspect quantity based on the content of the first telemetry data;
identifying a collection rate for the suspect quantity in a collection plan used to obtain the first telemetry data; and
establishing, in the revised collection plan, a revised collection rate for the suspect quantity that exceeds the collection rate for the suspect quantity.

13. The non-transitory machine-readable medium of claim 12, wherein obtaining the revised collection plan further comprises:
identifying a second suspect quantity based on the suspect quantity, the collection plan indicating that the second suspect quantity is not monitored; and
establishing, in the revised collection plan, a collection rate for the second suspect quantity.

14. The non-transitory machine-readable medium of claim 13, wherein identifying the suspect quantity comprises:
performing anomaly detection for the first telemetry data using a telemetry data repository, the anomaly detection indicating that the suspect quantity is anomalous.

15. The non-transitory machine-readable medium of claim 14, wherein identifying the suspect quantity comprises:
performing rules based analysis for the first telemetry data, the rules based analysis indicating that the suspect quantity is not correlated with another quantity from the first telemetry data that is correlated with the suspect quantity.

16. The non-transitory machine-readable medium of claim 10, wherein obtaining the second telemetry data comprises:
configuring the data processing system to perform telemetry collection based on the revised collection plan; and
obtaining the second telemetry data from the configured data processing system.

17. The non-transitory machine-readable medium of claim 10, wherein the operations further comprise:
performing, using the second telemetry data, reinforced learning to update operation of an inference model used to obtain the action set.

18. The non-transitory machine-readable medium of claim 17, wherein obtaining the action set comprises:
ingesting, by the inference model, the second telemetry data to identify an action of the action set; and
adding the action to the action set.

19. A data processing system, comprising:
a processor; and
a memory coupled to the processor to store instructions, which when executed by the processor, cause the processor to perform operations for managing operation of data processing systems, the operations comprising:
obtaining, using first telemetry data for a first data processing system of the data processing systems, a first inference indicating:
a health status for the first data processing system, and
a confidence level for the first inference;
in a first instance of the first inference where the confidence level for the first inference falls below a threshold:
obtaining, based on content of the first telemetry data, a revised collection plan for the first data processing system;
obtaining, using the revised collection plan, second telemetry data for the first data processing system;
obtaining, using the second telemetry data, a second inference indicating:
a revised health status for the first data processing system, and
a confidence level for the second inference;
obtaining, using the revised health status, an action plan; and
updating operation of the first data processing based on the action plan to reduce a likelihood of the first data processing system becoming impaired.

20. The data processing system of claim 19, wherein the operations further comprise:
in a second instance of the first inference where the confidence level for the first inference meets a threshold:
obtaining, using the health status, a second action plan; and
updating operation of the first data processing based on the second action plan to reduce the likelihood of the first data processing system becoming impaired.

* * * * *